(12) United States Patent
Wang

(10) Patent No.: US 11,392,228 B2
(45) Date of Patent: Jul. 19, 2022

(54) MOUSE DEVICE

(71) Applicant: Silitek Electronics (Dongguan) Co., Ltd, Guang Dong Province (CN)

(72) Inventor: KeCheng Wang, Guangdong Province (CN)

(73) Assignee: Silitek Electronics (Dongguan) Co., Ltd., Guang Dong Province (CN)

(*) Notice: Subject to any disclaimer, the term of this patent is extended or adjusted under 35 U.S.C. 154(b) by 0 days.

(21) Appl. No.: 17/039,849

(22) Filed: Sep. 30, 2020

(65) Prior Publication Data
US 2021/0149501 A1 May 20, 2021

(30) Foreign Application Priority Data
Nov. 18, 2019 (CN) .......................... 201911127512.3

(51) Int. Cl.
*G06F 3/0362* (2013.01)
*G06F 3/0354* (2013.01)

(52) U.S. Cl.
CPC ........ *G06F 3/0362* (2013.01); *G06F 3/03543* (2013.01); *G06F 2203/0332* (2013.01)

(58) Field of Classification Search
CPC .... G06F 3/0362; G06F 3/0312; G06F 3/0354; G06F 3/03541; G06F 2203/0332
See application file for complete search history.

(56) References Cited

U.S. PATENT DOCUMENTS

| | | | |
|---|---|---|---|
| 6,608,616 B2 * | 8/2003 | Lin | ........................ G06F 3/0202 345/163 |
| 2014/0204030 A1 * | 7/2014 | Li | ........................ G06F 3/03543 345/166 |

* cited by examiner

*Primary Examiner* — Hang Lin
(74) *Attorney, Agent, or Firm* — Umberg Zipser LLP; Ryan Dean

(57) ABSTRACT

The present disclosure provides a mouse device comprising a casing and a scroll wheel assembly. The casing comprises an upper casing and a lower casing. The scroll wheel assembly is disposed between the upper casing and the lower casing, which comprises a securing base secured to the lower casing, a rotary base disposed on the securing base, a scroll wheel component movably disposed on the rotary base rotatable around a first axis relative to the rotary base, a measuring component secured to the rotary base, and a transmission mechanism connected to the rotary base, wherein the transmission mechanism transmits external force to the rotating base, such that the rotary base rotates around a second axis relative to the securing base to adjust the offset angle of the scroll wheel component.

20 Claims, 14 Drawing Sheets

(a)

(b)

(c)

MOUSE DEVICE

CROSS REFERENCE TO RELATED APPLICATION

This application claims the priority benefit of Chinese Patent Application Serial Number CN201911127512.3, filed on Nov. 18, 2019, the full disclosure of which is incorporated herein by reference.

BACKGROUND

Technical Field

The present disclosure relates to the technical field of input devices, and more particularly to a mouse device.

Related Art

The typical mouse devices have the scroll wheels secured in a fixed axis so as scrolling direction is non-adjustable. After a long-time use of the mouse devices equipped with conventional scroll wheels, fatigue and discomfort of fingers to users would occur as they could only scroll the wheel in one direction.

SUMMARY

The embodiments of the present disclosure provide a mouse device intending to solve the issue that the unchangeable scroll direction of the conventional mouse devices, and the issue of fatigue and discomfort of fingers under long-term use.

The present disclosure provides a mouse device, comprising: a casing and a scroll wheel assembly. The casing comprises an upper casing and a lower casing. The scroll wheel assembly is disposed between the upper casing and the lower casing, which comprises a securing base secured to the lower casing, a rotary base disposed on the securing base, a scroll wheel component movably disposed on the rotary base rotatable around a first axis relative to the rotary base a measuring component secured to the rotary base, and a transmission mechanism connected to the rotary base, wherein the transmission mechanism transmits external force to the rotating base, such that the rotary base rotates around a second axis relative to the securing base to adjust the offset angle of the scroll wheel component.

The embodiments of the present disclosure could relieve the fatigue and discomfort of fingers under long-term use such that the scrolling direction of scroll wheels could be changed by the cooperation of the transmission mechanism and the rotary base to adjust the offset angle of the scroll wheel assembly.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
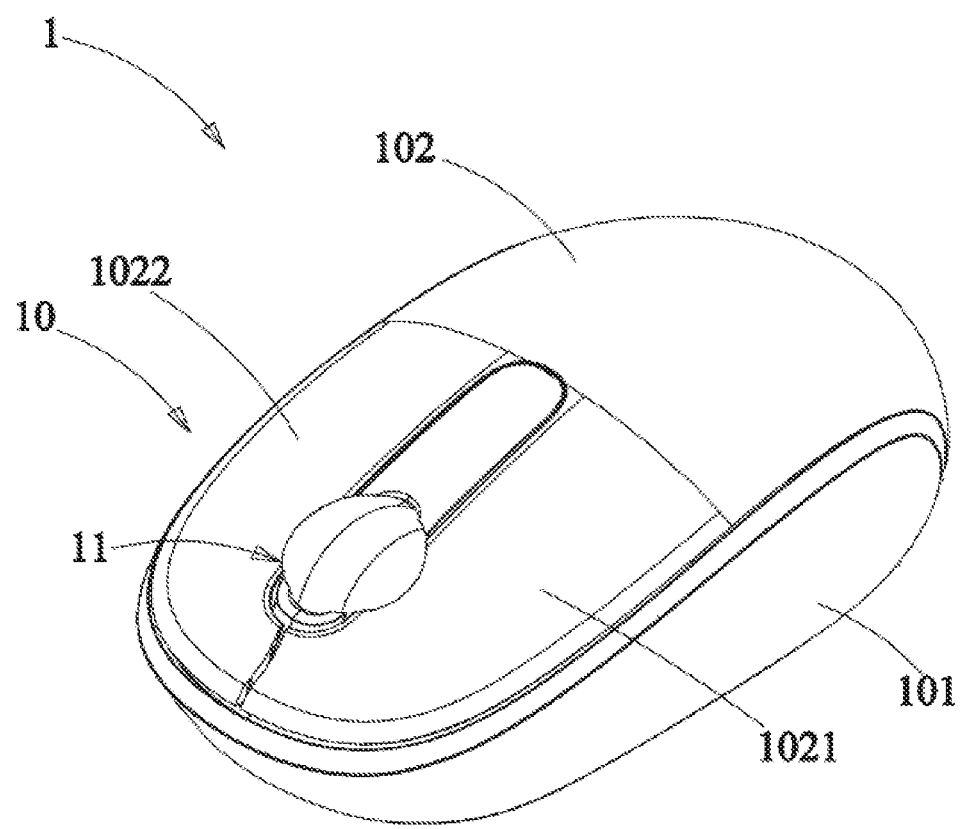
FIG. 1 is a perspective view of a mouse device of the first embodiment of the present disclosure.

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that comprises a series of elements not only include these elements, but also comprises other elements not specified expressly, or may include inherent elements of the process, method, object, or device. If no more limitations are made, an element limited by "include a/an . . ." does not exclude other same elements existing in the process, the method, the article, or the device which comprises the element.

In the following embodiment, the same reference numerals are used to refer to the same or similar elements throughout the invention.

Figure 2:
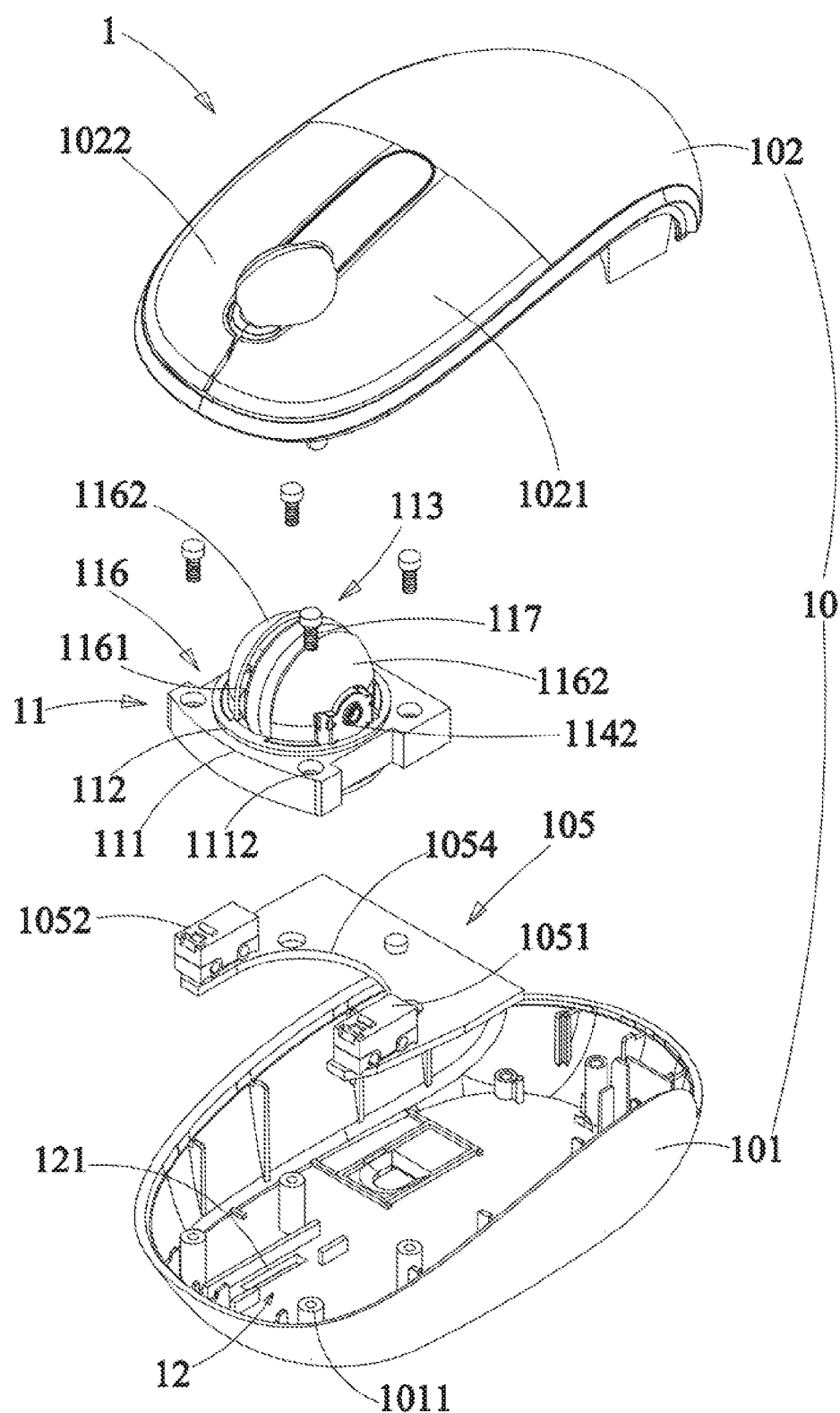
FIG. 2 is the first exploded view of a mouse device of the first embodiment of the present disclosure.
Figure 3:
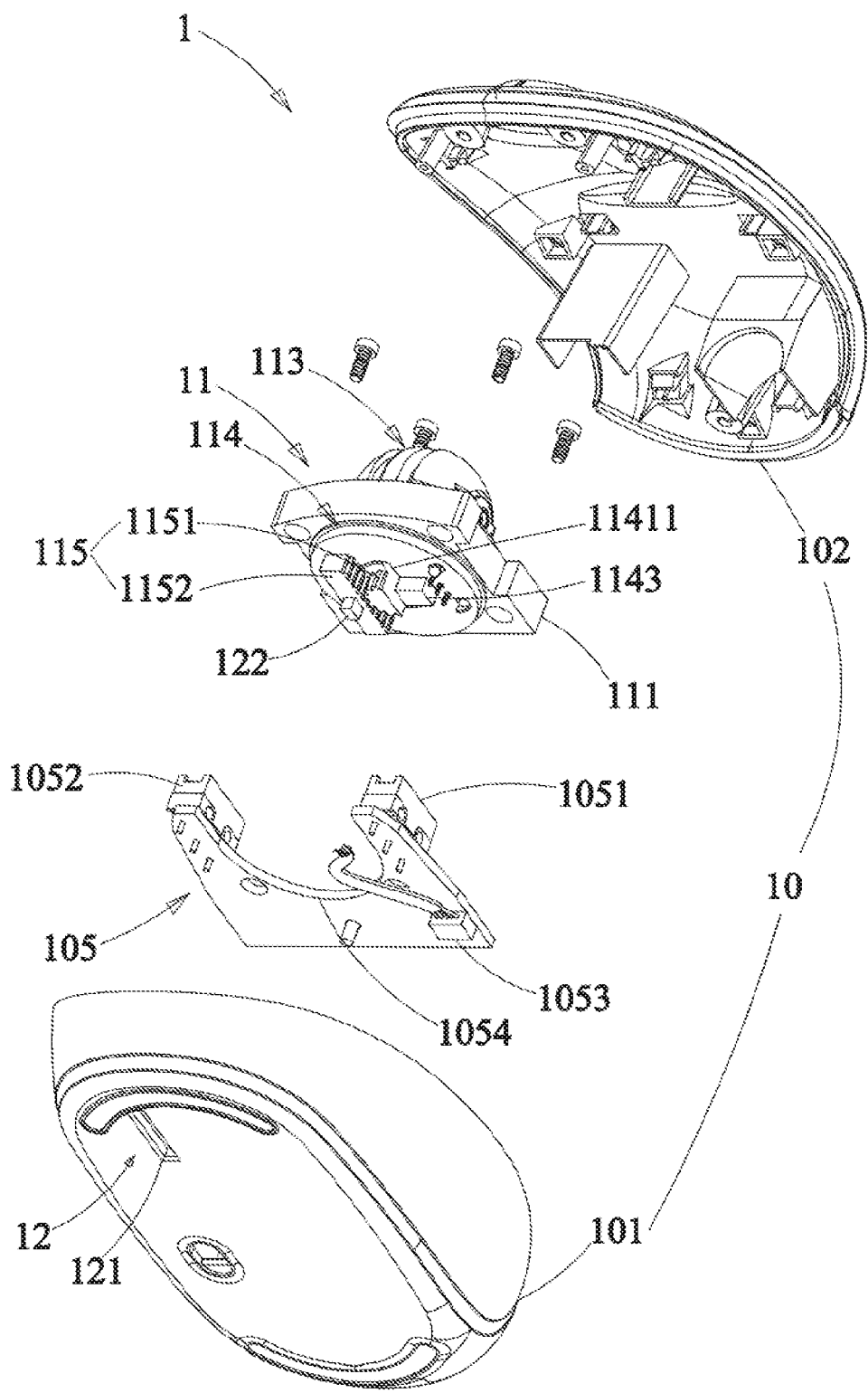
FIG. 3 is the second exploded view of a mouse device of the first embodiment of the present disclosure.

FIG. 1, FIG. 2 and FIG. 3 are a perspective view, a first exploded view, and a second exploded view of a mouse device of the first embodiment of the present disclosure. As shown in the figures, the mouse device 1 comprises a casing 10 and a scroll wheel assembly 11. The casing 10 comprises a lower casing 101 and an upper casing 102. The scroll wheel assembly 11 is disposed in a space between the lower casing 101 and the upper casing 102. A part of the scroll wheel assembly 11 is exposed from the upper casing 102. The scroll wheel assembly 11 could be operated from the outside of the casing 10.

Figure 4:
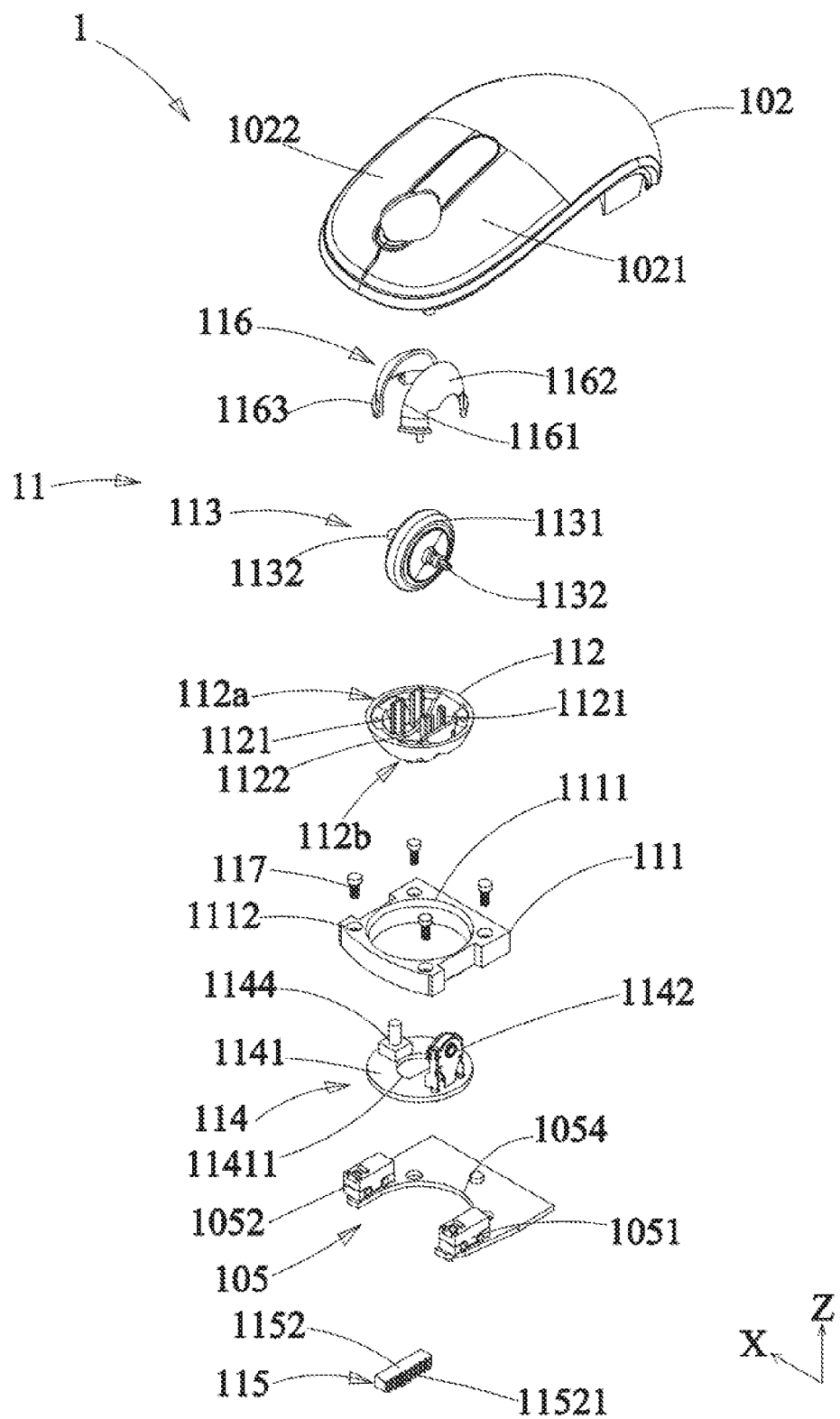
FIG. 4 is the third exploded view of a mouse device of the first embodiment of the present disclosure.
Figure 5:
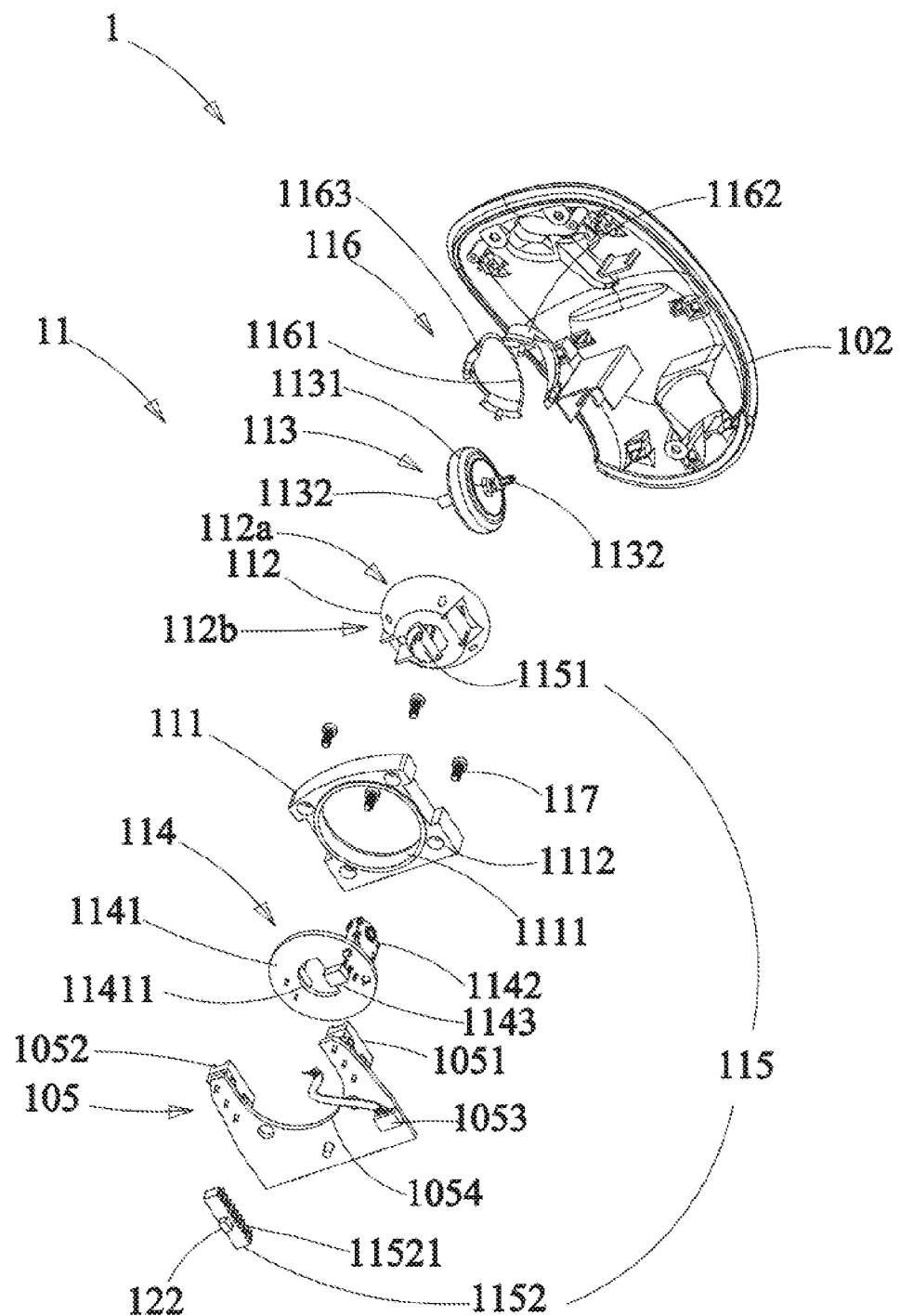
FIG. 5 is the fourth exploded view of a mouse device of the first embodiment of the present disclosure.
Figure 6:
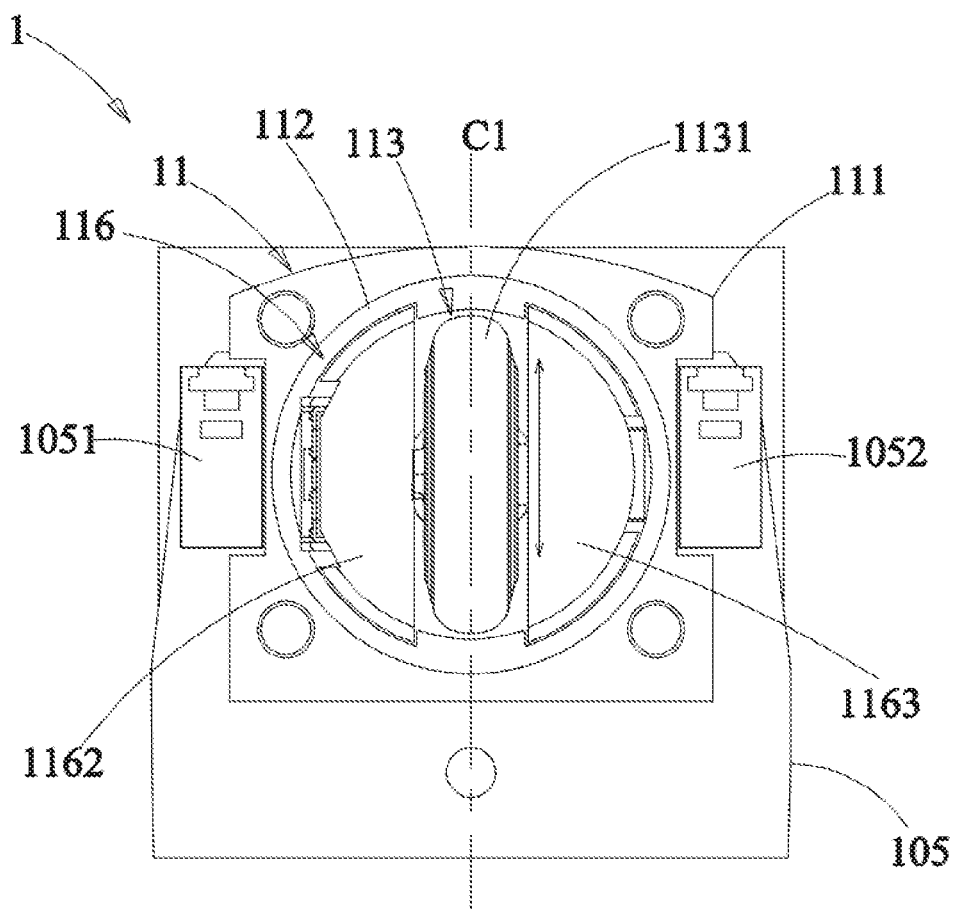
FIG. 6 is a partial schematic view of a mouse device of the first embodiment of the present disclosure.

FIG. 4, FIG. 5 and FIG. 6 are a third exploded view, a fourth exploded view and a partial schematic view of a mouse device of the first embodiment of the present disclosure. As shown in the figures, the scroll wheel assembly 11 comprises a securing base 111, a rotary base 112, a scroll wheel component 113, a measuring component 114 and a transmission mechanism 115. The securing base 111 is secured to the lower casing 101 of the casing 10. The rotary base 112 is disposed on the securing base 111. In this embodiment, the securing base 111 comprises a first perforation 1111 penetrating the securing base 111. The rotary base 112 is disposed in the first perforation 1111 of the securing base 111 and is able to rotate relative to the securing base 111. The rotary base 112 comprises a first side 112a and a second side 112b. The first side 112a is one side of the rotary base 112 away from the lower casing 101. The second side 112b is one side of the rotary base 112 close to the lower casing 101.

The scroll wheel component 113 is movably disposed on one side of the rotary base 112 away from the lower casing 101. That is, the scroll wheel component 113 is movably disposed on the first side 112a of the rotary base 112, and the scroll wheel component 113 rotates around the first axis X relative to the rotary base 112. The measuring component 114 is disposed on the rotary base 112 and measures the rotating of the scroll wheel component 113 to generate rotating information of the scroll wheel component 113. The transmission mechanism 115 connects to one side of the rotary base 112 at the place close to the lower casing 101. That is, the transmission mechanism 115 connects to the second side 112b of the rotary base 112. By applying an external force to the transmission mechanism 115, the transmission mechanism 115 transmits the force to the rotary base 112, rotating the rotary base 112 and the scroll wheel component 113 around the second axis Z relative to the securing base 111 to adjust the offset angle of the scroll wheel component 113. When the securing base 111, the rotary base 112, the scroll wheel component 113, the measuring component 114 and the transmission mechanism 115 are assembled, the securing base 111 is secured to the lowercasing 101 of the casing 10 to secure the scroll wheel assembly 11 onto the lower casing 101. In this embodiment, the securing base 111 comprises a plurality of securing holes 1112. A plurality of securing columns 1011 is provided on the bottom surface of the lower casing 101. The plurality of securing columns 1011 corresponds to the plurality of securing holes 1112. When the securing base 111 is disposed on the lower casing 101, the plurality of securing columns 1011 are respectively inserted into the corresponding securing holes 1112 to locate the position of the securing base 111 on the lower casing 101. The securing base 111 is finally secured to the lower casing 101 by passing the plurality of securing parts 117 through the corresponding securing holes 1112 and securing the securing parts 117 onto the securing columns 1011. The above manner for securing the securing base 111 to the lower casing 101 is only one embodiment of the present disclosure, the securing base 111 can be secured to the lower casing 101 by other securing methods. For example, the securing columns 1011 can be omitted, so that the securing parts 117 can be directly secured to the lower casing 101 through corresponding securing holes 1112.

Therefore, the scroll wheel component 113 of the mouse device 1 of this embodiment can rotate individually around the first axis X and can drive the rotary base 112 by the transmission mechanism 11 to rotate the scroll wheel component 113 around the seconds axis Z, offsetting the scroll wheel component 113 relative to the centerline C1 of the mouse device 1 and adjust the scrolling direction of the scroll wheel component 113. The rolling direction of the scroll wheel component 113 and the centerline C1 of the mouse device 1 forms an offset angle.

Back to the FIG. 3 and FIG. 4, The transmission mechanism 115 of this embodiment comprises a transmission gear 1151 and a transmission rack 1152. The transmission gear 1151 is disposed on the second side 112b of the rotary base 112. The rotation center of the transmission gear 1151 is disposed on the central axis of the rotary base 112. The transmission rack 1152 is disposed on the lower casing 101 of the casing 10 and is connected to the transmission gear 1151. In this embodiment, the transmission rack 1152 is in connection with the transmission gear 1151 by meshing. When the external force drives the transmission rack 1152 to move along the tangential direction of the transmission gear 1151 on the lower casing 101 of the housing 10, the transmission rack 1152 rotates the transmission gear 1151 rotating the rotary base 112 and the measuring component 114 simultaneously. The scroll wheel component 113 is offset relative to the centerline C1 of the mouse device 1 as the rotary base 112 rotates to adjust the offset angle of the scrolling direction of the scroll wheel component 113 relative to the centerline C1 of the mouse device 1.

The transmission mechanism 115 of this embodiment further comprises a first bump 122 disposed on the transmission rack 1152. Correspondingly, a groove 121 is provided on the lower casing 101. The first bump 122 penetrates the groove 121 and is exposed from the casing 10. The transmission g rack 1152 of the transmission mechanism 115 can be moved by pushing the first bump 122 to operate the transmission mechanism 115. In another embodiment, the length direction of the groove 121 is parallel to the extending direction of the transmission rack 1152 to ensure the first bump 122 drives the transmission rack 1152 to move in the tangential direction of the transmission gear 1151 when the first bump 122 moves along the length direction of the groove 121.

In another embodiment, the mouse device 1 of the present disclosure may comprise a limiting member limiting the offset angle of the scroll wheel component 113. In this embodiment, the limiting member of the mouse device 1 is implemented by the combination of the first bump 122 and the groove 121. That is, the groove 121 is provided with a limited length to limit the displacement of the first bump 122, thereby limiting the displacement of the transmission rack 1152 and the rotation angle of the transmission gear 1151. In this embodiment, the transmission gear 1151 is a sector gear. The length of the groove 121 is smaller than the length of the transmission rack 1152 and is also smaller than the circumference length of the transmission gear 1151. In this way, the detaching of the transmission gear 1151 from the transmission rack 1152 due to the displacement of the first bump 122 exceeds the circumference length of the transmission gear 1151 can be avoided.

In addition, the limiting member can be implemented by other methods, for example, a stopper can be provided on the transmission rack 1152 or the transmission gear 1151 to limit the displacement between the transmission gear 1151 and the transmission rack 1152. Alternatively, a stopper may be provided inside the lower casing 101 to limit the displacement of the transmission rack 1152. The above descriptions are all included in the scope of the present disclosure.

Figure 7:
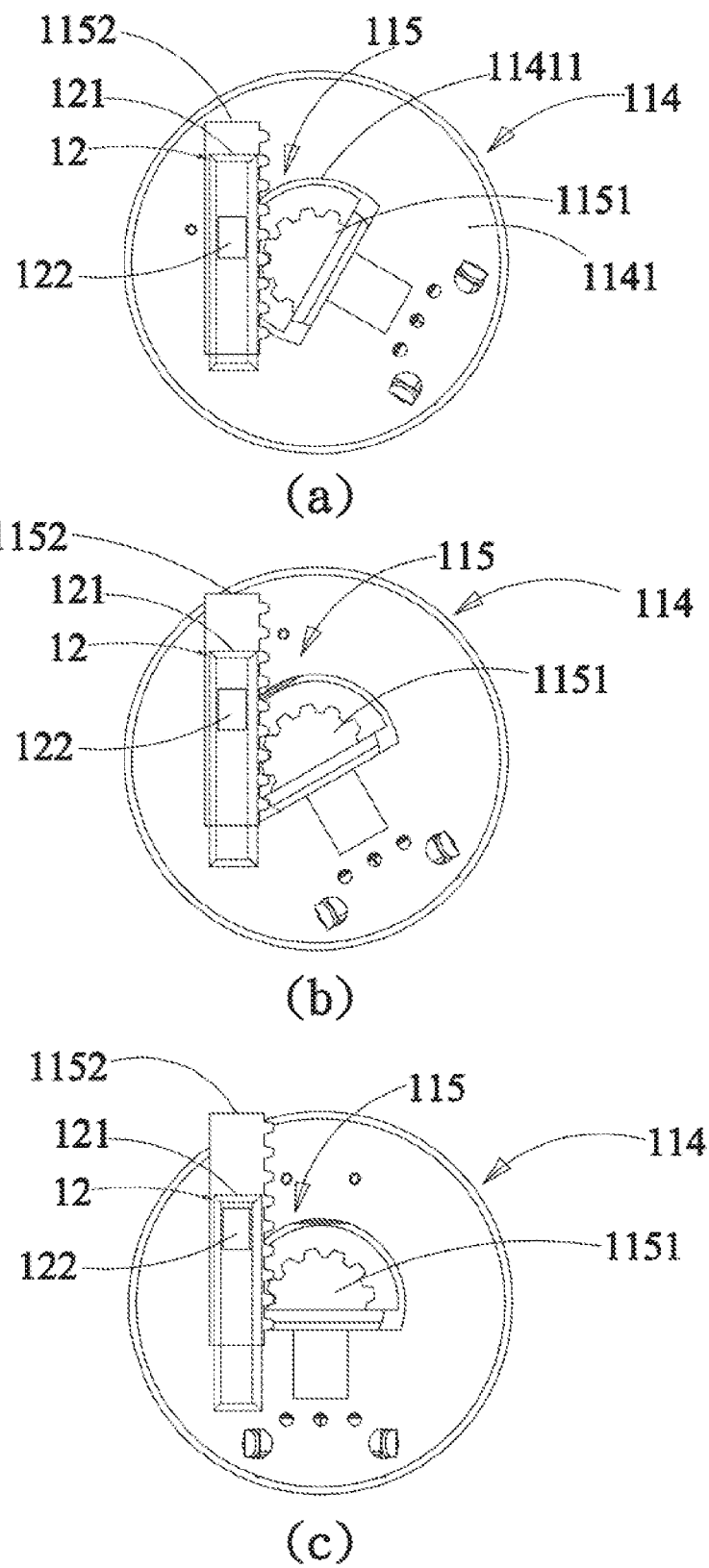
FIG. 7 is an illustration of the condition of use of the transmission mechanism of the first embodiment of the present disclosure.
Figure 8:
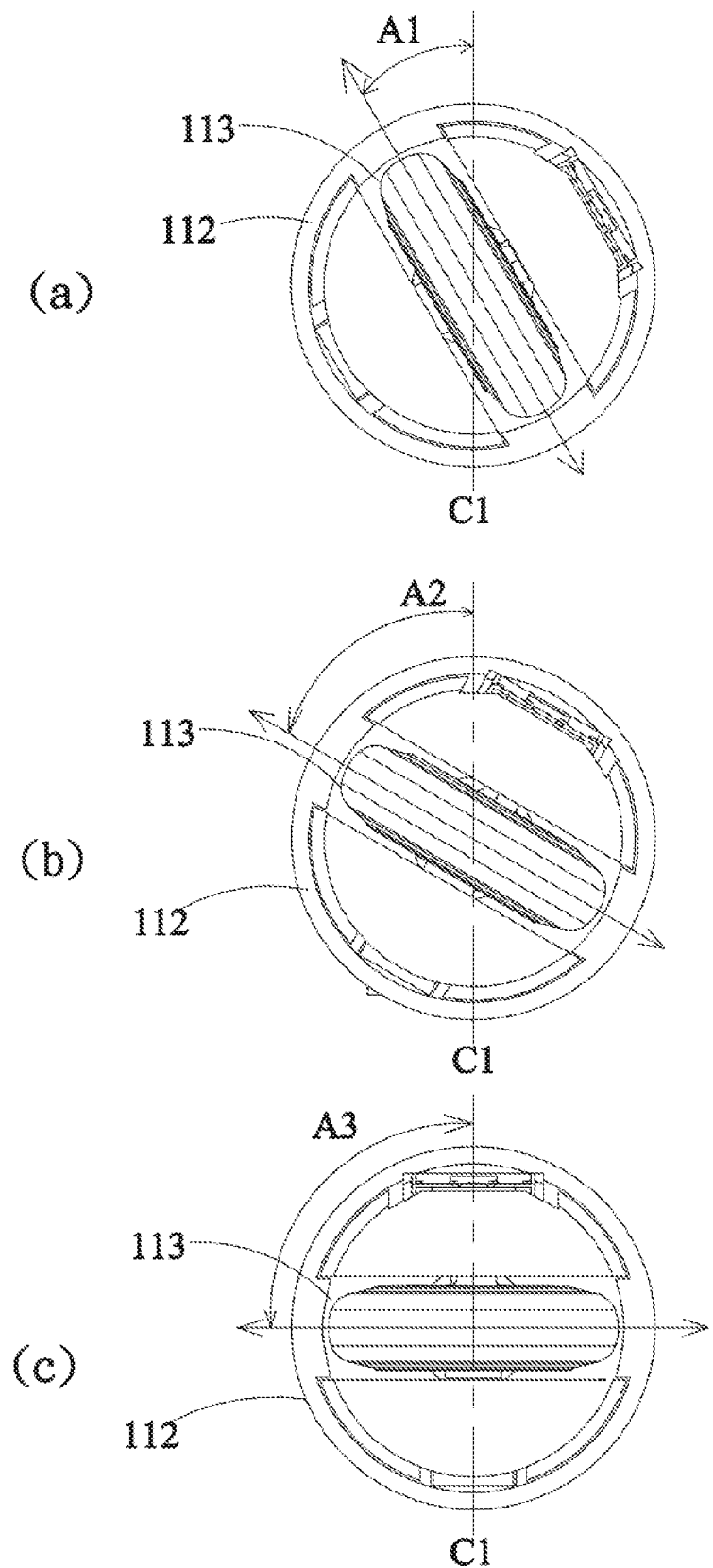
FIG. 8 is an illustration of the condition of use of the scroll wheel component of the first embodiment of the present disclosure.

FIG. 7 to FIG. 10 are illustrations of the condition of use of the transmission mechanism and the scroll wheel component of the first embodiment of the present disclosure. As shown in the figures, the initial position of the first bump 122 is at the center of the groove 121. The rotation angle of the transmission gear 1151 is between −90 degrees and 90 degrees. The FIG. 7 indicates that the first bump 122 moves upward from the initial position along the length direction of the groove 121. The first bump 122 drives the transmission rack 1152 to move along the tangential direction of the transmission gear 1151. In FIG. 7, (a) indicates that the first bump 122 moves upward from the initial position along the length of the groove 121 once (one unit length), the first bump 122 moves the transmission rack 1152 upward along the tangential direction of the transmission gear 1151, the transmission rack 1152 rotates the transmission gear 1151 clockwise in the figure, the transmission gear 1151 rotates the rotary base 112, the rotary base 112 rotates the scroll wheel component 113 and the measuring component 114. In FIG. 8, (a) indicates that the scrolling direction of the scroll wheel component 113 and the centerline C1 of the mouse device 1 form an angle A1, which is −30 degrees, showing that the offset angle of the scroll wheel component 113 is −30 degrees.

In FIG. 7, (b) indicates that the first bump 122 moves upward from the initial position along the length of the groove 121 twice (two-unit length), the first bump 122 drives the transmission mechanism 115 rotating the rotary base 112 rotating the scroll wheel component 113 and the measuring component 114. In FIG. 8, (b) indicates that the scrolling direction of the scroll wheel component 113 and the centerline C1 of the mouse device 1 form an angle A2, which is −60 degrees, showing that the offset angle of the scroll wheel component 113 is −60 degrees. In FIG. 7. (c) indicates that the first bump 122 moves upward from the initial position along the length of the groove 121 three times (three-unit length), the first bump 122 drives the transmission mechanism 115 rotating the rotary base 112 rotating the scroll wheel component 113 and the measuring component 114. In FIG. 8, (c) indicates that the scrolling direction of the scroll wheel component 113 and the centerline C1 of the mouse device 1 form an angle A3, which is −90 degrees, showing that the offset angle of the scroll wheel component 113 is −90 degrees.

Figure 9:
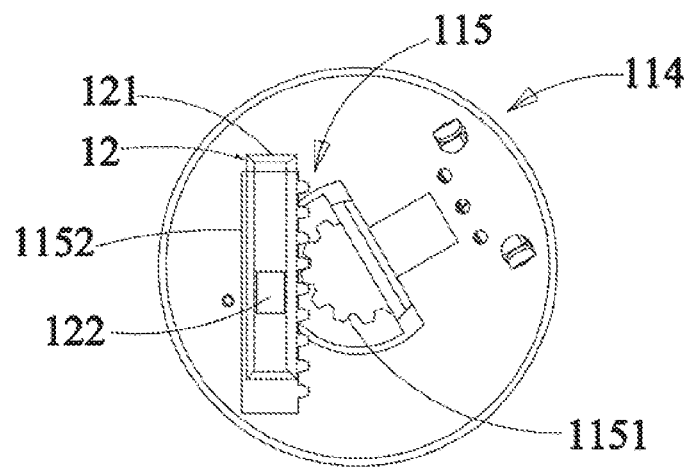
FIG. 9 is another illustration of the condition of use of the transmission mechanism of the first embodiment of the present disclosure.
Figure 9:
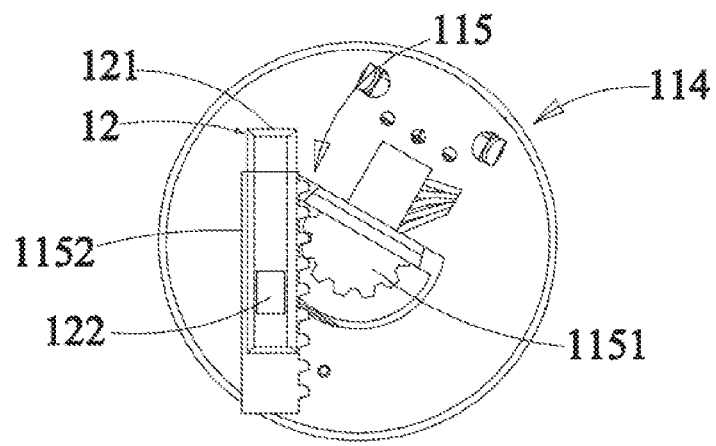
Figure 9:
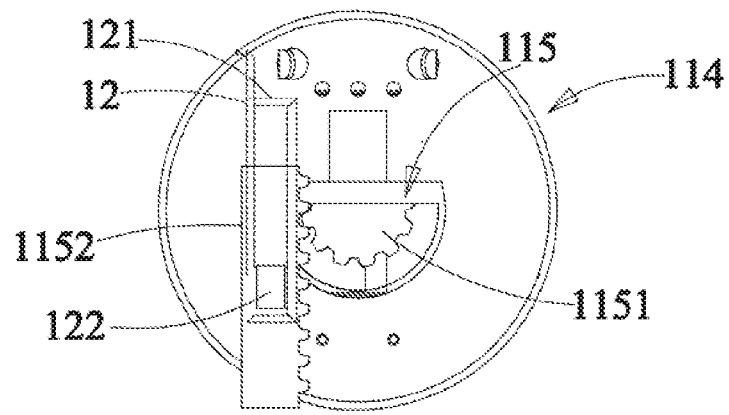
Figure 10:
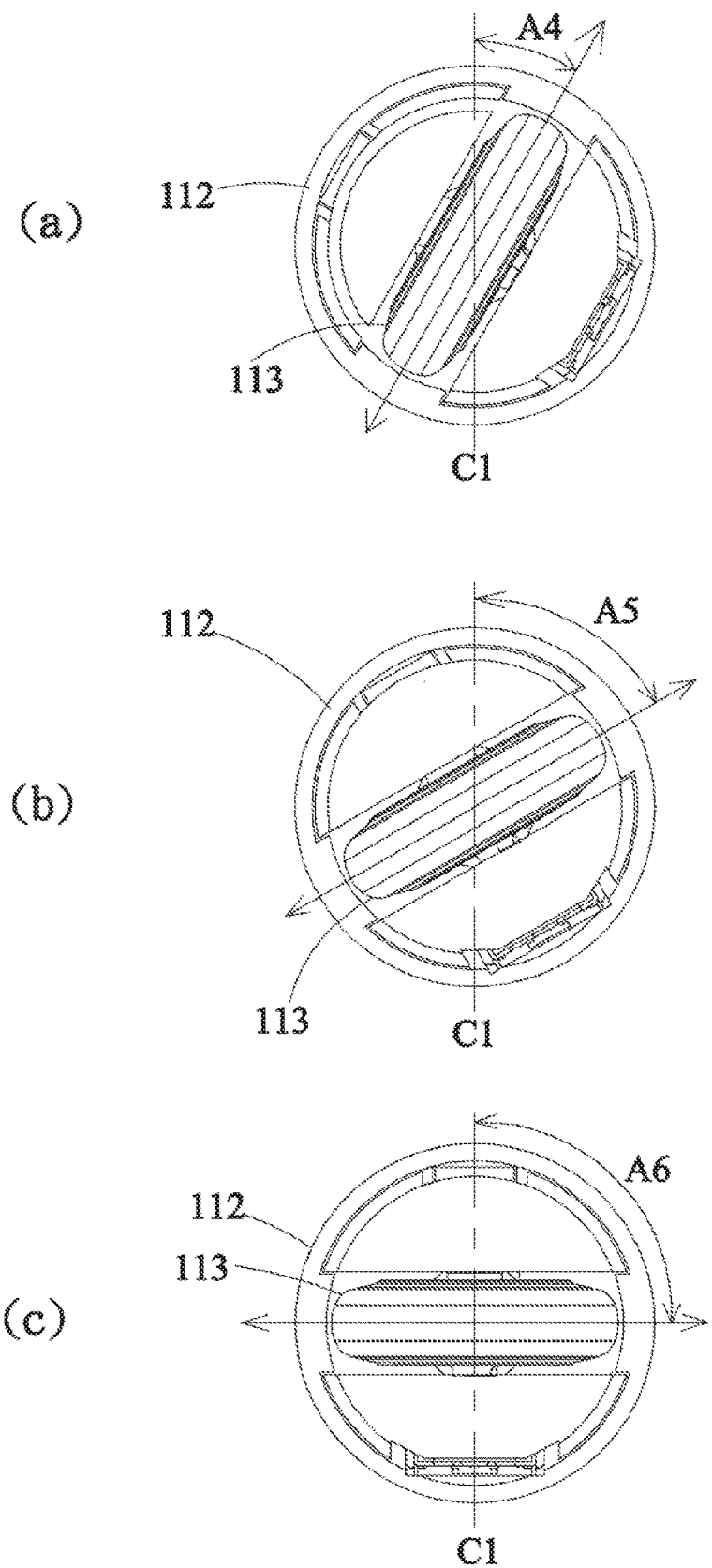
FIG. 10 is another illustration of the condition of use of the scroll wheel component of the first embodiment of the present disclosure.

FIG. 9 indicates that the first bump 122 moves downward from the initial position along the length direction of the groove 121. In FIG. 9, (a), (b) and (c) respectively indicate that the first bump 122 moves downward from the initial position along the length of the groove 121 one, two and three times (one, two and three-unit length, respectively), the first bump 122 drives the transmission mechanism 115 rotating the rotary base 112 rotating the scroll wheel component 113 and the measuring component 114. In FIG. 10, (a), (b) and (c) respectively indicate that the scrolling direction of the scroll wheel component 113 and the centerline C1 of the mouse device 1 form angles A4, A5 and A6 which are 30, 60 and 90 degrees, showing that the offset angles of the scroll wheel component 113 are 30, 60 and 90 degrees. Therefore, through the meshing control of the transmission rack 1152 and the transmission gear 1151, the transmission rack 1152 could rotate the transmission gear 1151 in an angle of −30 degrees or 30 degrees each time, as the offset angle of the scroll wheel component 113 is controlled to be retained in a range between −90 degrees and 90 degrees.

Figure 11:
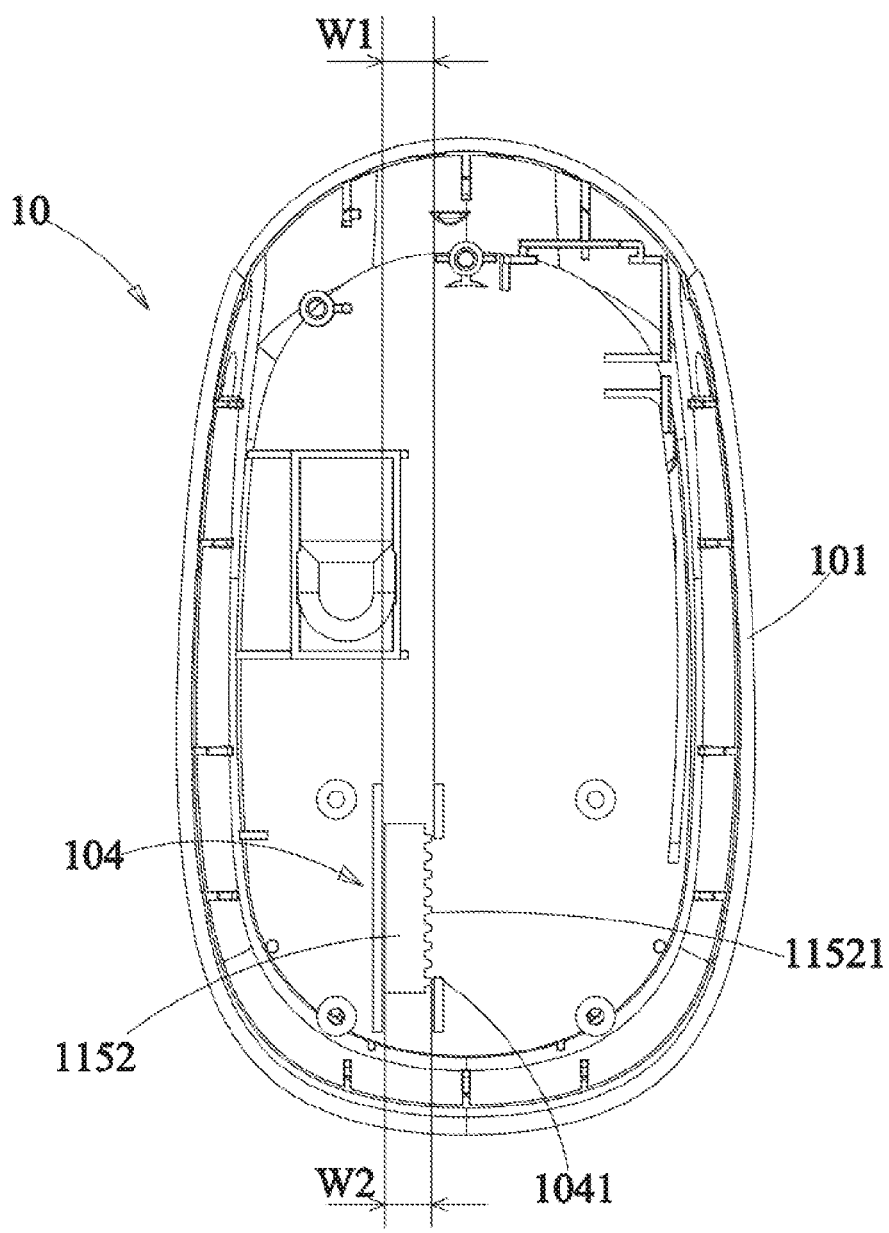
FIG. 11 is a schematic view of the lower casing of the first embodiment of the present disclosure.

In another embodiment, FIG. 11 shows the lower casing 101 of the casing 10 is further provided with a retaining wall part 104 disposed on two sides of the transmission rack 1152 to limit the operating direction and prohibit linear displacement of the transmission rack 1152. The retaining wall part 104 is provided with an opening 1041. The tooth part 11521 of the transmission rack 1152 corresponds to the opening 1041, that is, the tooth part 11521 of the transmission rack 1152 is exposed from the opening 1041 to mesh with the transmission gear 1151. In another embodiment, the width W1 of the retaining wall part 104 is greater than or equal to the width W2 of the transmission rack 1152, so as to ensure that the transmission rack 1152 is able to move within the retaining wall structure 104 and to reserve sufficient gap between the transmission rack 1152 and the retaining wall part 104, avoiding any unfavored friction resulting in possible immobility within the retaining wall part 104 for the transmission rack 1152.

In this embodiment, the measuring component 114 comprises a plate 1141, an encoder 1142, and a signal transmitter 1143. The encoder 1142 is disposed on the plate 1141 and is adjacent to the scroll wheel component 113. The encoder 1142 optically or mechanically measures the rotation of the scroll wheel component 113 and generates rotation information of the scroll wheel component 113. The signal transmitter 1143 is disposed on the plate and is electrically connected to the encoder 1142 to transmit the rotation information of the scroll wheel component 113 measured by the encoder 1142. The measuring component 114 further comprises a contact sensor 1144, which is disposed on the plate 1141 and corresponds to the encoder 1142. The contact sensor 1144 is adjacent to the scroll wheel component 113 and is electrically connected to the signal transmitter 1143. The contact sensor 1144 is used to detect whether the scroll wheel component 113 is pressed. When the scroll wheel component 113 is pressed to contact the contact sensor 1144, the touch sensor 1144 generates an induction signal and transmits the induction signal through the signal transmitter 1143.

The measuring component 114 is disposed on the second side 112b of the rotary base 112, and the plate 1141 of the measuring component 114 is disposed on the surface of the securing base 111 close to the lower casing 101. The encoder 1142 and the contact sensor 1144 pass through the first perforation 1111 of the securing base 11*l* and pass through the rotary base 112. The encoder 1142 and the contact sensor 1144 are disposed in the rotary base 112 and are adjacent to the scroll wheel component 113 to precisely measure the rotation of the scroll wheel component 113 and detect whether the scroll wheel component 113 is pressed. In this embodiment, the plate 1141 of the measuring component 114 further comprises a second perforation 11411 enabling the transmission gear 1151 to be connected to the second side 112b of the rotary base 112 through the second perforation 11411. That is, the rotary base 112 is disposed on the surface of the lower casing 101 of the plate 1141 away from the casing 10, and the transmission gear 1151 is disposed on the surface of the plate 1141 close to the lower casing 101 of the casing 10.

The lower casing 101 of the casing 10 is further provided with a circuit board 105 comprising a left-button sensor 1051 and a right-button sensor 1052. The left-button sensor 1051 and the right-button sensor 1052 are oppositely disposed, and are respectively disposed on two sides of the securing base 111. The left-button sensor 1051 corresponds to the left button 1021 of the upper casing 102, and the right-button sensor 1052 corresponds to the right button 1021 of the upper casing 102. The left-button sensor 1051 detects whether the left button 1021 is pressed, and the right-button sensor 1052 detects whether the right button 1021 is pressed. The circuit board 105 of this embodiment is identical to the circuit board of conventional mouse devices, therefore it would not be repeated herein.

The circuit board 105 further comprises a mouse device signal transmitter 1053. The signal transmitter 1143 of the measuring component 114 of this embodiment is connected to the mouse device signal transmitter 1053 of the circuit board 105 by wire to transmit signals. Signal transmitter 1143 and mouse device signal transmitter 1053 are electrical connectors. The signal transmitter 1143 and the mouse signal transmitter 1053 are connected by a data cable. In another embodiment, the signal transmitter 1143 of the measuring component 114 is wirelessly connected to the mouse device signal transmitter 1053 of the circuit board 105 to transmit signals. In another embodiment, the circuit board 105 may comprise an opening 1054 accommodating the plate 1141 of the measuring component 114, which is conducive to the miniaturization of the mouse device 1.

In this embodiment, the rotary base 112 comprises two pivoting parts 1121 disposed opposite to each other. The scroll wheel component 113 is disposed between the two pivoting parts 1121 and is movably connected to the two pivoting parts 1121. In this embodiment, the scroll wheel component 113 comprises a scroll wheel body 1131 and a shaft 1132 passing through the center of the scroll wheel body 1131 disposed between the two pivoting parts 1121. Two ends of the shaft 1132 are movably connected to the corresponding pivoting parts 1121 respectively. The gap between the two pivoting parts 1121 is greater than or equal to the width of the scroll wheel body 1131 such that the position of the scroll wheel body 1131 could be restricted between the two pivoting parts 1121, avoiding offsetting of the scroll wheel body 1131 when scrolling.

In another embodiment, an accommodating space 1122 is provided within the bowl-shaped rotary base 112. A part of the scroll wheel body 1131 is disposed in the accommodating space 1122, that is, a part of the scroll wheel body 1131 is exposed from the rotary base 112, so that the height of the scroll wheel component 113 exposed from the rotary base 112 is reduced, so as to reduce the overall height of the mouse device 1.

In another embodiment, the scroll wheel assembly 11 further comprises a cover 116 disposed on the first side 112a of the rotary base 112. The cover 116 is provided with a limiting opening 1161 and covers a part of the scroll wheel component 113, so a part of the scroll wheel component 113 is exposed from the limiting opening 1161. The cover 116 covers the shaft 1132 on two sides of the scroll wheel body 1131 of the scroll wheel component 113. The scroll wheel body 1131 corresponds to the limit opening 1161 and is exposed from the limiting opening 1161. The cover 116 prevents external dust or dirt from entering the scroll wheel assembly 11. In addition, the limiting opening 1161 can also prevent the scroll wheel body 1131 from moving in the extending direction of the first axis X. In this embodiment, the cover 116 is provided with a first cover 1162 and a second cover 1163. The first cover 1162 and the second cover 1163 are oppositely disposed on the rotary base 112 and are respectively disposed on two sides of the scroll wheel component 113 to cover the shaft 1132 on two sides of the scroll wheel body 1131. The limiting opening 1161 is disposed between the first cover 1162 and the second cover 1163. The scroll wheel body 1131 of the scroll wheel component 113 corresponds to the limiting opening 1161 and is exposed from the limiting opening 1161. Two parts of the first cover 1162 and the second cover 1163 constitute the cover 116, which is conducive to the manufacturing and to the assembling of the cover 116 on the rotary base 112.

Figure 12:
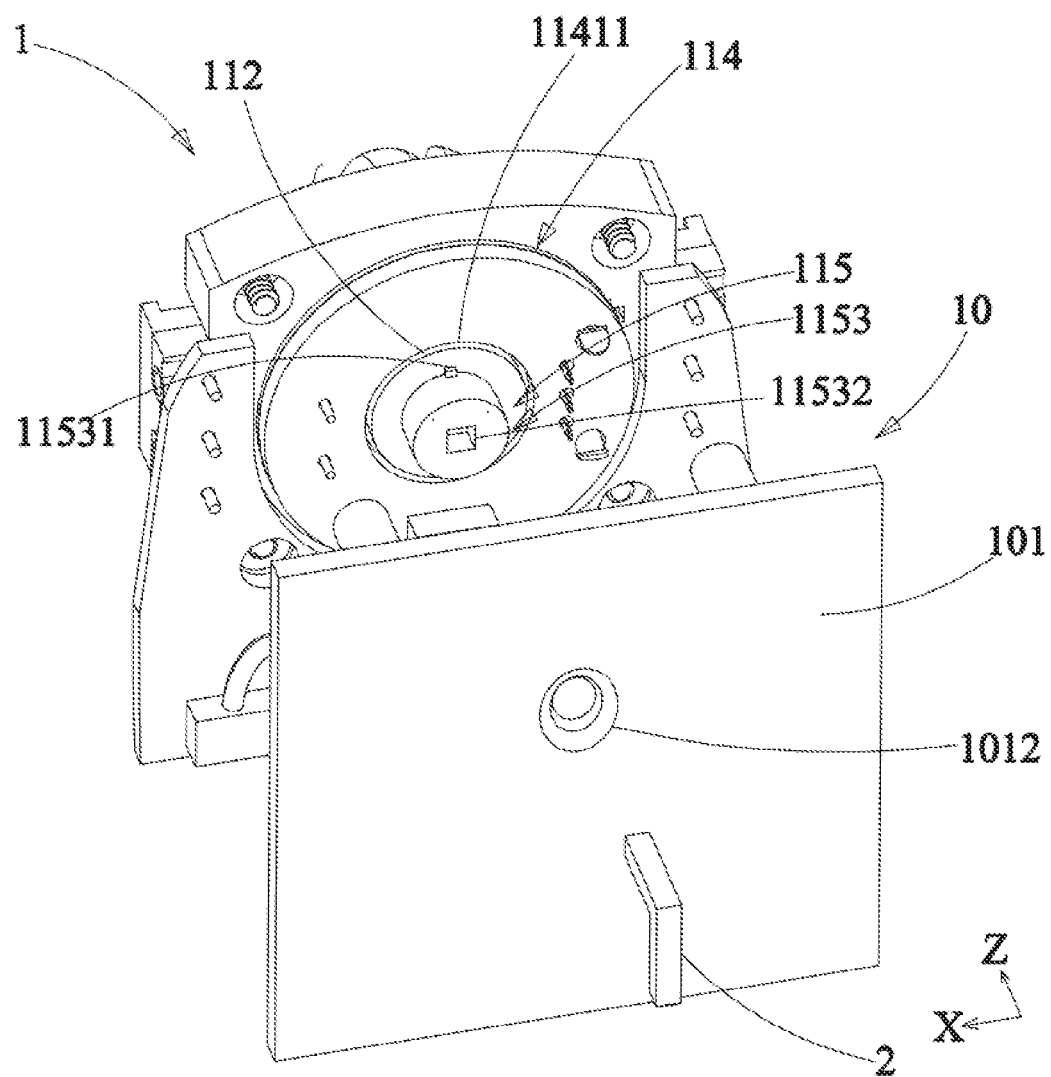
FIG. 12 is a partially exploded view of a mouse device of the second embodiment of the present disclosure.
Figure 13:
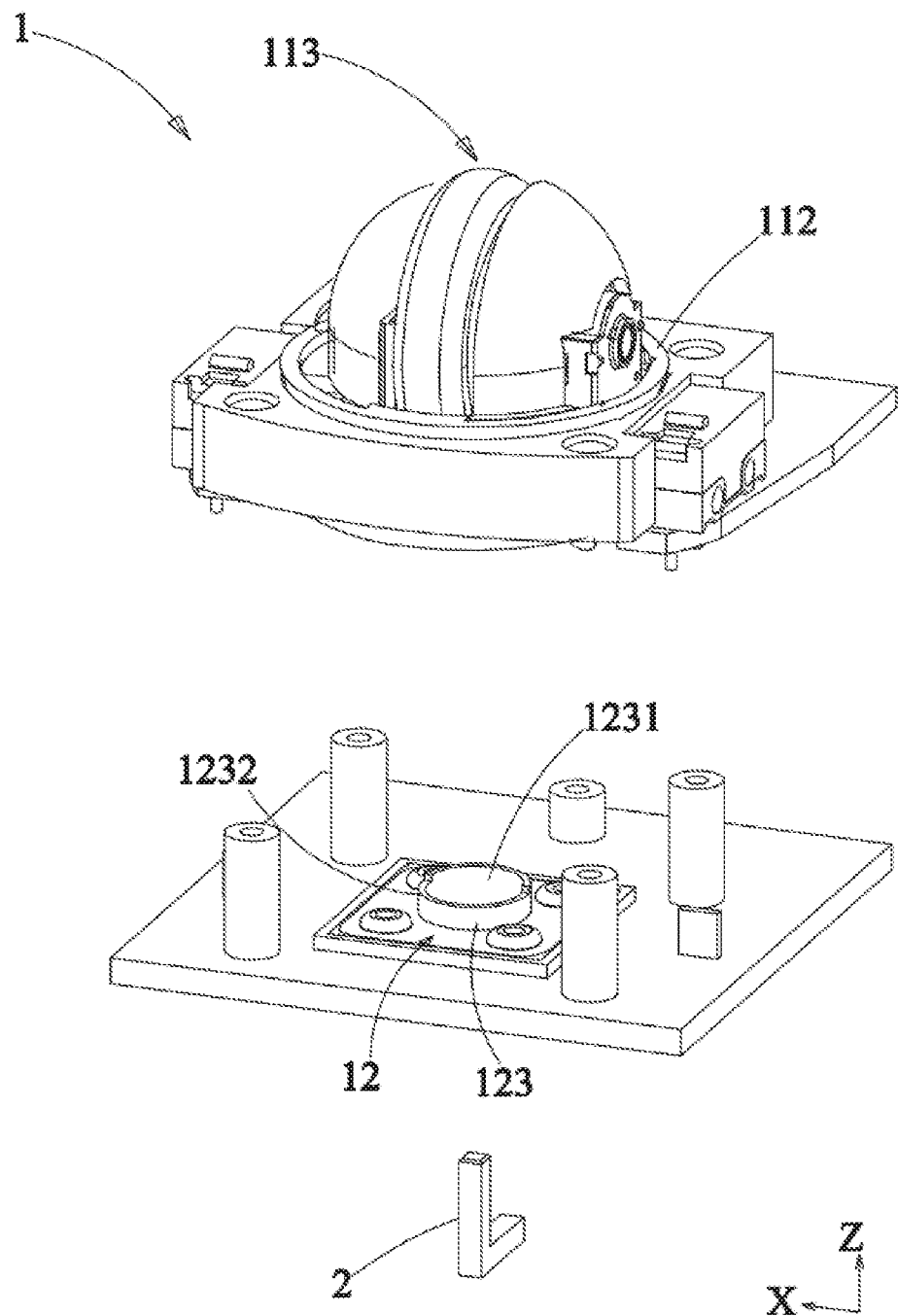
FIG. 13 is another partially exploded view of a mouse device of the second embodiment of the present disclosure.

FIG. 12 and FIG. 13 are partially exploded views of a mouse device of the second embodiment of the present disclosure. As shown in the figures, the mouse device 1 of this embodiment is different from that of the first embodiment in that this embodiment provides a different type transmission mechanism 115 with a limiting design. The transmission mechanism 115 of this embodiment comprises a transmission shaft 1153 disposed on the rotary base 112 and passes through the second perforation 11411 of the plate 1141 of the measuring component 114. A transmission shaft hole 11531 is provided on the transmission shaft 1153. A casing hole 1012 is provided on the lower casing 101 of the casing 10. The casing hole 1012 corresponds to the transmission shaft hole 11531, which indicates that the transmission shaft hole 11531 communicates with the casing hole 1012. When adjusting the offset angle of the scroll wheel component 113 by the transmission mechanism 115, the turning tool 2 (such as a wrench) is inserted into the transmission shaft hole 11531 from the housing hole 1012 and the turning tool 2 is able to be rotated to rotate the transmission shaft 1153 rotating the rotary base 112 and the measuring component 114 secured on the rotary base 112 rotating the scroll wheel component 113 to will adjust the offset angle of the scrolling direction of the scroll wheel component 113 relative to the centerline of the mouse device 1. A limiting part 12 limits the displacement of a bump 11532 so as to limit the rotation angle of the scroll wheel component 113 driven by the rotary base 112, and further limit the offset angle of the scroll wheel component 113. The cross-sectional shape of the above transmission shaft hole 11531 matches the cross-sectional shape of the turning tool 2. In this embodiment, the cross-sectional shape of the transmission shaft hole 11531 is square, so a turning tool 2 with a square cross-section is necessary. The cross-sectional shape of the transmission shaft hole 11531 can also be a pentagon, hexagon or polygon. The cross-sectional shape of the turning tool 2 needs to conform with the cross-sectional shape of the transmission shaft hole 11531.

In another embodiment, in order to implement the limiting mechanism, the mouse device 1 can be exemplarily provided with a shaft bushing 123 and a bump 11532, between which the existing physical interference could be used to implement the limiting mechanism. Practically, the shaft bushing 123 is disposed on the lower casing 101 of the casing 10 and corresponds to the casing hole 1012. The shaft bushing 123 is provided with a shaft bushing opening 1231 and a slot 1232 disposed on the sidewall of the shaft bushing opening 1231. Meanwhile, the bump 11532 is disposed at the position of the transmission shaft 1153 corresponding to the slot 1232. When the transmission shaft 1153 is disposed in the shaft bushing opening 1231 of the shaft bushing 123, the bump 11532 is disposed in the slot 1232, rotates with the transmission shaft 1153, and moves in the slot 1232. The slot 1232 extends along with the circumference of the shaft bushing opening 1231 and is provided with a limited length limiting the displacement of the bump 11532 to limit the rotation angle of the scroll wheel component 113 driven by the rotary base 112, and further limits the offset angle of the scroll wheel component 113. The central axis of the transmission shaft hole 11531 and the shaft bushing opening 1231 are disposed on the second axis Z. In this way, the transmission mechanism 115 can rotate the rotary base 112 around the second axis Z. In another embodiment, a damper is provided between the shaft bushing 123 and the transmission shaft 1153. That is, a damper is provided on the surface of the shaft bushing 123 facing the transmission shaft 1153 and/or on the surface of the transmission shaft 1153 facing the shaft bushing 123. By increasing the friction between the shaft bushing 123 and the transmission shaft 1153 through the damper, the control of the rotation angle of the transmission shaft 1153 relative to the shaft bushing 123 is facilitated, so as to precisely control the offset angle of the scroll wheel component 113.

Figure 14:
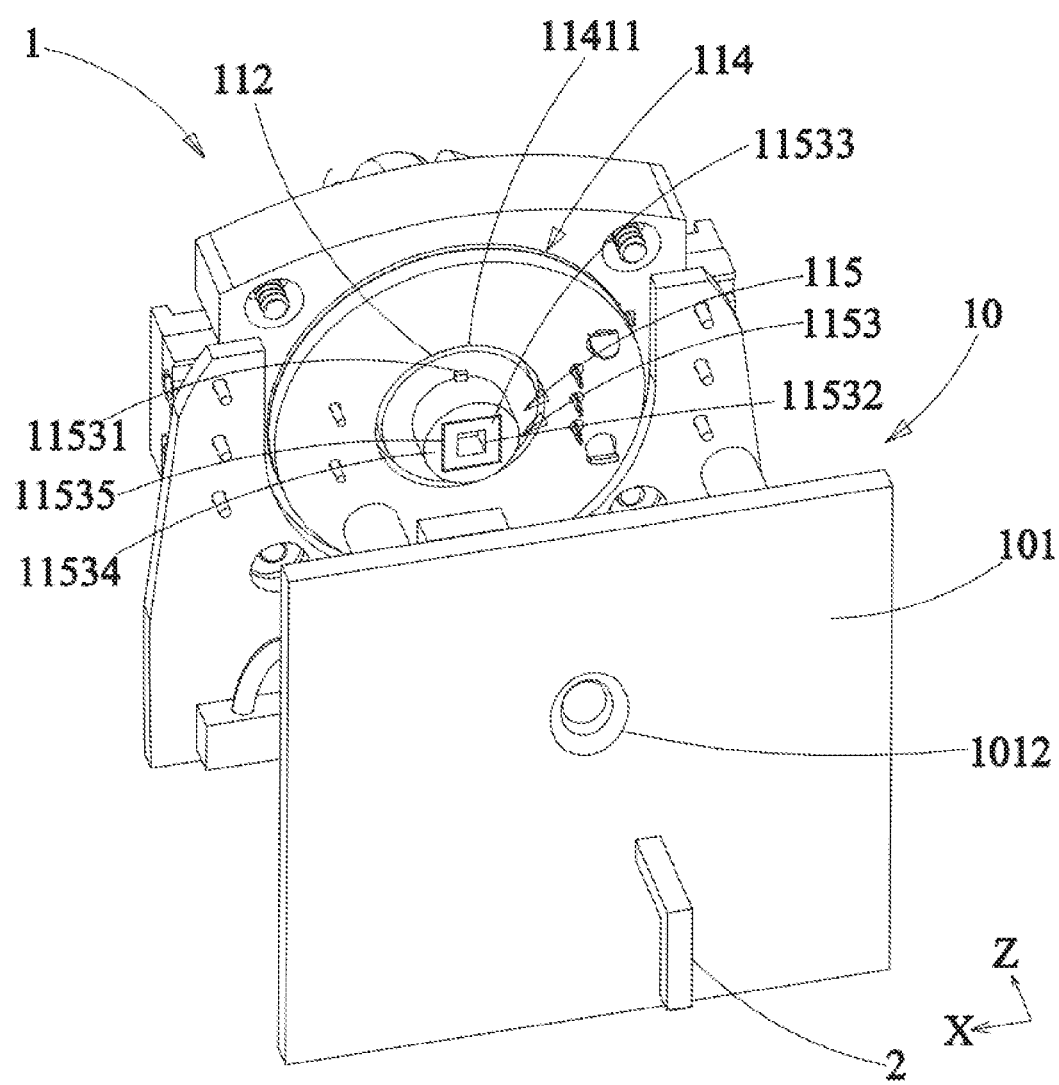
FIG. 14 is a partially exploded view of a mouse device of the third embodiment of the present disclosure.

FIG. 14 is a partially exploded view of a mouse device of the third embodiment of the present disclosure. As shown in the figure, the transmission shaft 1153 may comprise a first shaft block 11533 and a second shaft block 11534. Practically, the first shaft block 11533 is disposed on the second side 112b of the rotary base 112 and is provided with a transmission shaft hole 11531. The second shaft block 11534 is provided with a shaft block hole 11535. The second shaft block 11534 is sleeved on the first shaft block 11533 through the shaft block hole 11535. In addition, a bump 11532 is disposed on the outer surface of the second shaft block 11534 to constitute a limiting mechanism with a slot 1232 on a shaft bushing 123. The central axis of the shaft block hole 11535, the transmission shaft hole 11531 and the bushing opening 1231 are all disposed on the second axis Z. In this way, the transmission mechanism 115 can rotate the rotary base 112 around the second axis Z. Therefore, the transmission shaft 1153 is a two-piece component. The second shaft block 11534 can be replaced base on the size of the shaft bushing 123. The cross-sectional shape of the shaft block hole 11535 is square or maybe triangular, quadrilateral, pentagonal, or polygonal, so as to prevent relative rotation between the second shaft block 11534 and the first shaft block 11533.

In summary, the present disclosure provides a mouse device, in which a rotary base is driven to rotate through a transmission mechanism. The rotary base rotates a scroll wheel component to adjust the offset angle of the scroll wheel component, thereby adjusting the scrolling angle of the scroll wheel component. In this way, it could prevent users from scrolling the scroll wheel component in an unchanged direction for a long time causing fatigue and discomfort for fingers.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A mouse device, comprising:
    a casing having an upper casing and a lower casing and having a centerline; and
    a scroll wheel assembly disposed between the upper casing and the lower casing, comprising:
    a securing base secured to the lower casing;
    a rotary base disposed on the securing base;
    a scroll wheel component movably disposed on the rotary base and being rotatable around a first axis relative to the rotary base, wherein the first axis lies within a horizontal plane;
    a measuring component secured to the rotary base; and
    a transmission mechanism connected to the rotary base, wherein the transmission mechanism transmits external force to the rotating base, such that the rotary base rotates around a second axis relative to the securing base to (i) rotate the scroll wheel assembly around the second axis such that the first axis rotates and lies within the horizontal plane, and (ii) to adjust the offset angle of the scroll wheel assembly, wherein the second axis is orthogonal to the first axis and the horizontal plane, and wherein the offset angle is defined by a scrolling direction of the scroll wheel component and the centerline.

2. The mouse device according to claim 1, wherein the transmission mechanism comprises:
    a transmission shaft disposed on the rotary base, the transmission shaft comprises a transmission shaft hole in communication with a casing hole of the casing.

3. The mouse device according to claim 2, comprising:
    a shaft bushing sleeved on the transmission shaft, wherein the transmission shaft comprises a bump and the shaft bushing comprises a slot; wherein the bump is disposed in and movable within the slot.

4. The mouse device according to claim 3, wherein the slot has a length; the moving distance of the bump is restricted by the length of the slot.

5. The mouse device according to claim 3, wherein a damper is provided between the shaft bushing and the transmission shaft.

6. The mouse device according to claim 4, wherein the transmission shaft comprises:
    a first shaft block disposed on the rotary base, the first shaft block comprises the transmission shaft hole; and
    a second shaft block comprising a shaft block hole and the limiting bump; the second shaft block is sleeved on the first shaft block; the transmission shaft block is disposed in the shaft block hole.

7. The mouse device according to claim 6, wherein the shape of a cross-sectional area of the shaft block hole can be triangular, quadrilateral, pentagonal or polygonal.

8. The mouse device according to claim 6, wherein the shaft bushing comprises a shaft bushing opening; the shaft bushing opening, the shaft block hole and a central axis of the transmission shaft hole are arranged on the second shaft.

9. The mouse device according to claim 2, wherein the shape of a cross-sectional area of the transmission shaft hole can be quadrilateral, pentagonal or polygonal.

10. The mouse device according to claim 1, wherein the transmission mechanism comprising:
   a transmission gear disposed on the rotary base; and
   a transmission rack disposed on the casing, wherein the transmission rack is connected to the transmission gear.

11. The mouse device according to claim 10, wherein the transmission mechanism comprises a first bump disposed on the transmission rack; the casing comprises a groove in which the first bump is disposed; the first bump is movable in the groove.

12. The mouse device according to claim 11, wherein the groove has length; the moving distance of the first bump is restricted by the length of the groove.

13. The mouse device according to claim 10, wherein the lower casing further comprises a retaining wall part with an opening; the transmission rack is disposed in the retaining wall part; the transmission rack meshes with the transmission gear through the opening.

14. The mouse device according to claim 1, wherein the rotary base comprises two pivoting parts oppositely disposed; the scroll wheel component is movably connected to the two pivoting parts.

15. The mouse device according to claim 14, wherein the rotary base comprises an accommodating space; the scroll wheel component between the two pivoting parts is disposed in the accommodating space.

16. The mouse device according to claim 1, wherein the scroll wheel component comprises a cover disposed on the rotary base; the cover comprises a limiting opening from which the scroll wheel component is exposed.

17. The mouse device according to claim 16, wherein the cover comprises a first cover and a second cover oppositely disposed on the rotary base; the first cover and the second cover are respectively disposed on two sides of the scroll wheel component; the limiting opening is disposed between the first cover and the second cover; the scroll wheel component corresponds to the limiting opening from which the scroll wheel component is exposed.

18. The mouse device according to claim 1 further comprising a circuit board disposed in the lower casing; the circuit board is electrically connected to the measuring component.

19. The mouse device according to claim 1, wherein the offset angle is between −90 degrees and 90 degrees.

20. The mouse device according to claim 1, wherein the measuring component comprises:
   a plate;
   an encoder disposed on the plate, wherein the encoder is adjacent to the scroll wheel component; the encoder optically or mechanically measures the rotation of the scroll wheel component so as to generates rotation information of the scroll wheel component;
   a signal transmitter disposed on the plate, wherein the signal transmitter is electrically connected to the encoder to transmit the rotation information.

* * * * *